(No Model.)

R. BRETTNER.
FINGER RING.

No. 299,051. Patented May 20, 1884.

Witnesses:
Henry Eichling
Chas. R. Clarke

Inventor
Rudolf Brettner
by B. F. Clark
his atty.

UNITED STATES PATENT OFFICE.

RUDOLF BRETTNER, OF NEW YORK, N. Y.

FINGER-RING.

SPECIFICATION forming part of Letters Patent No. 299,051, dated May 20, 1884.

Application filed March 7, 1884. (No model.)

*To all whom it may concern:*

Be it known that I, RUDOLF BRETTNER, of the city of New York, county and State of New York, am the inventor of a new article of manufacture, the same being a finger-ring constructed with openings provided for holding photographic pictures and other designs, of which the following is a specification.

Figure 1:
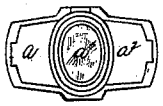
Figure 2:
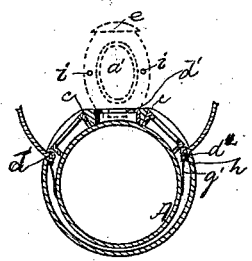
Figure 3:
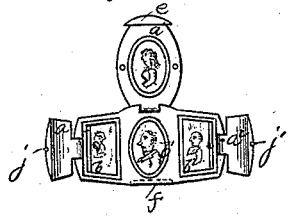
Figure 4:
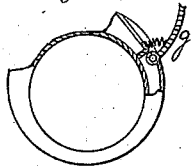
Figure 5:
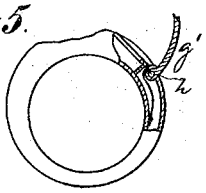

In the manufacture of my new article of manufacture I take the ring to be operated on, which generally has a broad face or shanks, as usually used in seal-rings, and as shown in Figure 1, and which shows the openings closed, which in looks resembles the common seal-ring, the stone being set in the center. In Fig. 2 I show the openings uncovered, the three covers or wings, $a$ $a'$ $a^2$, being thrown back, and in Fig. 3 I show the pictures inserted therein. In Figs. 4 and 5 I show modifications of the springs which operate the wings or covers $a$ and $a^2$, as hereinafter described.

In making the ring containing my invention the inside is first made hollow and the apertures set down into the body of the ring at $b$, $b'$, and $b^2$. The part $c$ $c$ of the main part of the ring is not cut out, thus making the ring so much stronger. The wings $a$ $a'$ $a^2$ are hinged to the upper surface of the ring at $d$ $d'$ $d^2$. The wing $a^2$ has a projecting lip, $e$, which, when the wing $a^2$ is shut, clasps over the bevel $f$ and serves to hold it fast when shut down. The springs $g$ $g'$ are placed inside the body of the ring, as shown in Fig. 4, the end $h$ resting under the hinge $d$, so as to throw the wing $a$ back open from off the aperture as soon as it is relieved from contact with wing or cover $a'$. Spring $d'$ rests in like manner under hinge in cover $a^2$. The opposite ends of said springs are fastened or confined in the body A of said ring, as shown by lines in said Fig. 5.

Instead of a straight spring, a spiral coil may be used, as shown in Fig. 4. I do not intend to limit myself, however, to any particular kind of spring. In the inner edge of wing $a'$ are the holes $i$ $i$, into which the studs $j$ on wing $a$ and stud $j'$ on wing $a^2$ project when the wing $a'$ is shut down on said wings. The surrounding rim of the apertures may be countersunk, so as to receive projections on the covers or wings, and so, when shut, prevent the water or dampness from entering and thus destroying the picture. It will be readily seen how any other means may be employed to obtain a like result. We will now shut down the wings $a$ and $a^2$, the springs $g$ and $g'$ resisting the pressure, the studs $j$ and $j'$ enter the holes $i$ and $i'$ as the wing $a'$ is pressed down over the two sides of said wings, and the said wing $a'$ held in position by lip $e$ shutting over bevel $f$. Now, if the wing $a'$ is released, the springs cause the two wings $a$ and $a^2$ to fly up, and thus carry with them the wing $a'$.

If desired, the wing $a'$ may contain a stone or jewel, and not have any aperture for a picture, but a clear open back, and only the two wings $a$ and $a^2$ cover apertures for pictures.

Any modification may be so made as to do away with the mode of fastening the wings $a$, $a'$, and $a^2$, as herein described, and I do not limit myself to the form herein shown.

What I claim, and desire to secure by Letters Patent, is—

1. As a new article of manufacture, a ring having apertures or openings for containing two or more pictures, &c., said apertures being covered by wings or coverings, substantially as shown, and for the purpose specified.

2. As a new article of manufacture, a ring having apertures or openings, with wings or coverings, and springs in combination with and operating said wings, substantially as described, and for the purpose specified.

3. As a new article of manufacture, a ring having apertures $b$, $b'$, and $b^2$, wings $a$ $a'$ $a^2$, operated or acted upon by springs $g$ $g'$, and the studs $j$ and $j'$, with holes $i$ $i'$ $i^2$ in said covers, substantially as described, and for the purpose specified.

Witness my hand this 6th day of March, 1884.

RUDOLF BRETTNER.

Witnesses:
B. S. CLARK,
M. OTYON OZINE.